(12) United States Patent
Wang et al.

(10) Patent No.: US 11,922,605 B2
(45) Date of Patent: Mar. 5, 2024

(54) SELECTIVE DISTORTION OR DEFORMATION CORRECTION IN IMAGES FROM A CAMERA WITH A WIDE ANGLE LENS

(71) Applicant: Hewlett-Packard Development Company, L.P., Spring, TX (US)

(72) Inventors: Tianran Wang, Beijing (CN); Hailin Song, Beijing (CN); Wenxue He, Beijing (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 375 days.

(21) Appl. No.: 17/294,565

(22) PCT Filed: Nov. 23, 2018

(86) PCT No.: PCT/CN2018/117141
§ 371 (c)(1),
(2) Date: May 17, 2021

(87) PCT Pub. No.: WO2020/103122
PCT Pub. Date: May 28, 2020

(65) Prior Publication Data
US 2022/0005162 A1 Jan. 6, 2022

(51) Int. Cl.
*G06T 5/00* (2006.01)
*G06T 3/00* (2006.01)
*G06T 7/11* (2017.01)

(52) U.S. Cl.
CPC ............ *G06T 5/006* (2013.01); *G06T 3/0018* (2013.01); *G06T 7/11* (2017.01); *G06T 2207/10016* (2013.01)

(58) Field of Classification Search
CPC ......... G06T 5/006; G06T 3/0018; G06T 7/11; G06T 2207/10016; G06T 2207/30201; H04N 7/14; H04N 23/611
See application file for complete search history.

(56) References Cited

U.S. PATENT DOCUMENTS 7,742,624 B2   6/2010   Super et al.
9,001,181 B2   4/2015   Yamashita
(Continued)

FOREIGN PATENT DOCUMENTS

CN   102282847 A   12/2011
CN   104658032 A   5/2015
(Continued)

OTHER PUBLICATIONS

International Search Report and Written Opinion in co-pending PCT/CN2018/117141, dated Aug. 16, 2019, 9 pages.
(Continued)

*Primary Examiner* — Ping Y Hsieh
(74) *Attorney, Agent, or Firm* — Quarles & Brady LLP

(57) ABSTRACT

A method includes receiving, at a conference endpoint, video captured using a wide angle lens. The method further includes selecting a view region in a frame of the video. The method further includes selectively applying, based on a size of the view region, deformation correction or distortion correction to the view region to generate a corrected video frame. The method further includes transmitting the corrected video frame to a remote endpoint.

17 Claims, 13 Drawing Sheets

(56) References Cited

U.S. PATENT DOCUMENTS

| | | | |
|---|---|---|---|
| 2005/0206659 A1* | 9/2005 | Cutler | G03B 37/00 |
| | | | 345/660 |
| 2010/0111440 A1* | 5/2010 | Chai | H04N 1/387 |
| | | | 382/275 |
| 2010/0123770 A1 | 5/2010 | Friel et al. | |
| 2011/0090303 A1* | 4/2011 | Wu | G06T 5/006 |
| | | | 348/241 |
| 2012/0093365 A1* | 4/2012 | Aragane | H04N 7/15 |
| | | | 348/E7.078 |
| 2013/0235467 A1 | 9/2013 | Heu | |
| 2013/0265383 A1 | 10/2013 | Yamashita | |
| 2015/0109401 A1 | 4/2015 | Kasatani et al. | |
| 2015/0138188 A1 | 5/2015 | Gillard et al. | |
| 2015/0145966 A1* | 5/2015 | Krieger | A61B 1/00194 |
| | | | 348/47 |
| 2016/0253791 A1 | 9/2016 | Kurata et al. | |
| 2019/0096041 A1* | 3/2019 | Allu | G06T 5/20 |
| 2019/0182453 A1* | 6/2019 | Lim | G06T 7/194 |

FOREIGN PATENT DOCUMENTS

| | | |
|---|---|---|
| CN | 104680505 | 6/2015 |
| KR | 10-2013-0103123 A | 9/2013 |
| TW | M503714 U | 6/2015 |
| WO | 2013062509 A1 | 5/2013 |

OTHER PUBLICATIONS

Lim, Johan, "Supplementary European Search Report dated May 30, 2022", European Patent Office Application No. 18940907.1, EPO, May 30, 2022.

* cited by examiner

Deformation Corrected - Includes Distortion Effects

Distortion Corrected - Includes Deformation Effects

SELECTIVE DISTORTION OR DEFORMATION CORRECTION IN IMAGES FROM A CAMERA WITH A WIDE ANGLE LENS

TECHNICAL FIELD

This disclosure relates to video processing, and more particularly to selectively correcting for distortion or deformation caused by a wide angle lens.

BACKGROUND

In videoconferencing a single camera, such as a wide angle camera or panoramic camera, can be used to capture a view feed containing multiple meeting participants, (a "room view"). A copy of the captured feed can be cropped to contain an enlarged view of a single person (such as a person who has been talking for a while) or group of persons at an endpoint. Another copy of the captured feed can be cropped to contain someone (or something) else, for example, a person who was speaking before the person in first copy. The individual views, being based on data captured by a wide angle curved lens, will be distorted and deformed when displayed on a flat surface. Thus, there is room for improvement in the art.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

Figure 1:
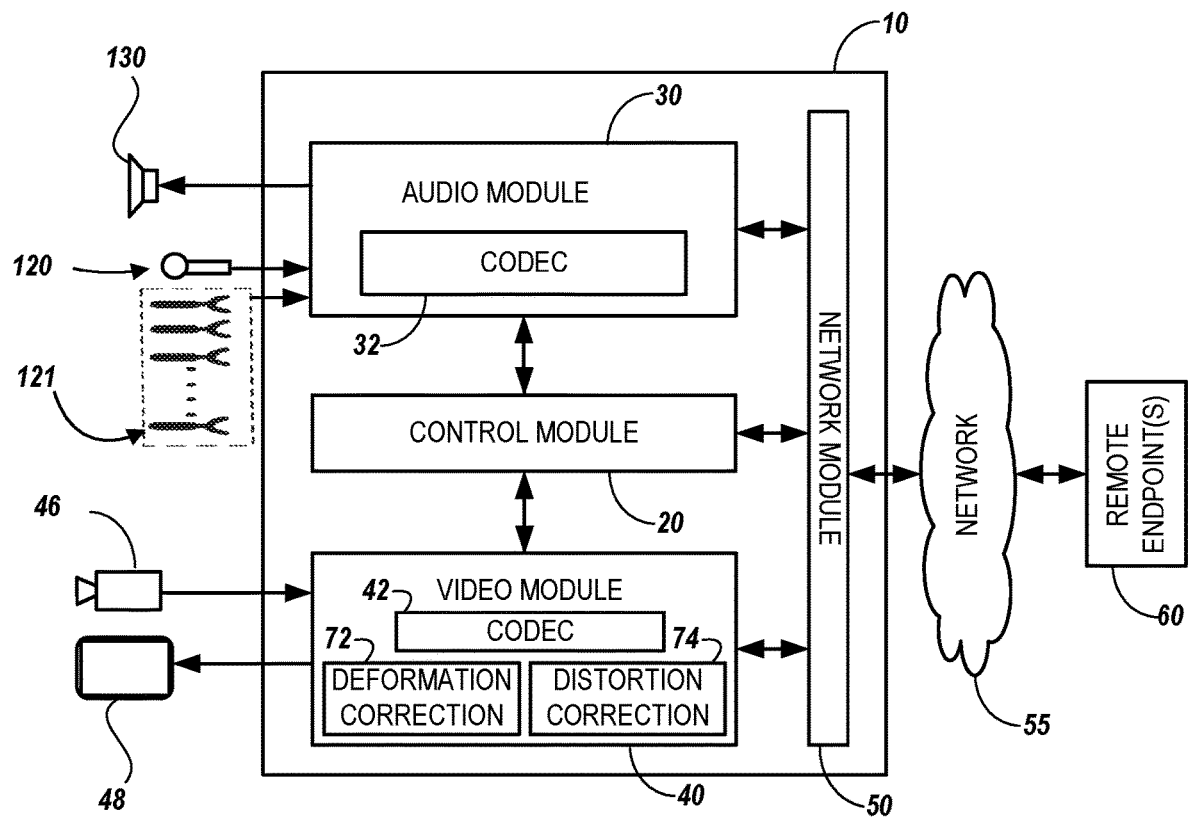
FIG. 1 illustrates an operational environment of embodiments of this disclosure.

In the drawings and the description of the drawings herein, certain terminology is used for convenience only and is not to be taken as limiting the embodiments of the present disclosure. In the drawings and the description below, like numerals indicate like elements throughout.

Images captured using a wide angle lens inherently include distortion effects and deformation effects. As used herein, distortion refers to bending of light such that straight lines appear curved in an image. As used herein, deformation refers to "stretching" in a portion of an image such that objects appear larger in one or more dimensions than is natural. Distortion or deformation may be corrected in an image by applying a transformation to the image. However, distortion and deformation may not both be corrected in an image at the same time. Distortion and deformation may be relatively more noticeable in different views of an image. For example, in a cropped view of an image, deformation may be more noticeable than in a full view of the image. Further, deformation may be more noticeable at edges of the image as compared to the center. Disclosed are systems and methods for selectively correcting distortion and deformation in images. While the disclosed systems and methods are described in connection with a teleconference system, it should be noted that the disclosed systems and methods may used in other contexts according to the disclosure.

FIG. 1 illustrates a possible operational environment for example circuits of this disclosure. Specifically, FIG. 1 illustrates a conferencing apparatus or endpoint 10 in accordance with an embodiment of this disclosure. The conferencing apparatus or endpoint 10 of FIG. 1 communicates with one or more remote endpoints 60 over a network 55. The endpoint 10 includes an audio module 30 with an audio codec 32, and a video module 40 with a video codec 42. These modules 30/40 operatively couple to a control module 20 and a network module 50. The modules 30/40/20/50 include dedicated hardware, software executed by one or more processors, or a combination thereof. In some examples, the video module 40 corresponds to a graphics processing unit (GPU), software executable by the graphics processing unit, a central processing unit (CPU), software executable by the CPU, or a combination thereof. In some examples, the control module 20 includes a CPU, software executable by the CPU, or a combination thereof. In some examples, the network module 50 includes one or more network interface devices, a CPU, software executable by the CPU, or a combination thereof. In some examples, the audio module 30 includes, a CPU, software executable by the CPU, a sound card, or a combination thereof.

In general, the endpoint 10 can be a conferencing device, a videoconferencing device, a personal computer with audio or video conferencing abilities, or any similar type of communication device. The endpoint 10 is configured to generate near-end audio and video and to receive far-end audio and video from the remote endpoints 60. The endpoint 10 is configured to transmit the near-end audio and video to the remote endpoints 60 and to initiate local presentation of the far-end audio and video.

A microphone 120 captures audio and provides the audio to the audio module 30 and codec 32 for processing. The microphone 120 can be a table or ceiling microphone, a part of a microphone pod, an integral microphone to the endpoint, or the like. Additional microphones 121 can also be provided. Throughout this disclosure all descriptions relating to the microphone 120 apply to any additional microphones 121, unless otherwise indicated. The endpoint 10 uses the audio captured with the microphone 120 primarily for the near-end audio. A camera 46 captures video and provides the captured video to the video module 40 and codec 42 for processing to generate the near-end video. For each frame of near-end video captured by the camera 46, the control module 20 selects a view region, and the control module 20 or the video module 40 crops the frame to the view region. The view region may be selected based on the near-end audio generated by the microphone 120 and the additional microphones 121, other sensor data, or a combination thereof. For example, the control module 20 may select an area of the frame depicting a participant who is currently speaking as the view region. As another example, the control module 20 may select the entire frame as the view region in response to determining that no one has spoken for a period of time. Thus, the control module 20 selects view regions based on a context of a communication session.

The camera 46 includes a wide angle lens. Due to the nature of wide angle lenses, video (and still images) captured by the camera 46 includes both distortion and deformation effects. The video module 40 includes deformation correction logic 72 and distortion correction logic 74. In some examples, the deformation correction logic 72 and the distortion correction logic 74 correspond to mapping tables that identify adjustments to make to images captured by the camera 46. The mapping tables may be based on properties of a lens of the camera 46, such as focal length, etc. For each frame of video captured by the camera 46, the video module 40 selects the deformation correction logic 72 or the distortion correction logic 40 based on a size of a view region selected by the control module 20 for that frame as described further below herein. The video module 40 then applies the selected correction logic to the view region of the frame to generate a corrected near end video frame. Thus, each corrected near-end video frame corresponds to a potentially cropped and corrected version of a video frame. The corrected near end video frames taken together comprise corrected near-end video.

The endpoint 10 uses the codecs 32/42 to encode the near-end audio and the corrected near-end video according to any of the common encoding standards, such as MPEG-1, MPEG-2, MPEG-4, H.261, H.263 and H.264. Then, the network module 50 outputs the encoded near-end audio and corrected video to the remote endpoints 60 via the network 55 using any appropriate protocol. Similarly, the network module 50 receives the far-end audio and video via the network 55 from the remote endpoints 60 and sends these to their respective codec 32/42 for processing. Eventually, a loudspeaker 130 outputs the far-end audio (received from a remote endpoint), and a display 48 outputs the far-end video. The display 48 also outputs the corrected near-end video in some embodiments.

Thus, FIG. 1 illustrates an example of a device that selectively corrects deformation or distortion in video captured by a camera with a wide angle lens. In particular, the device of FIG. 1 may operate according to one of the methods described further below with reference to FIGS. 3A-B and 7A-B. As described below, these methods may improve video quality during a communication session.

Figure 2:
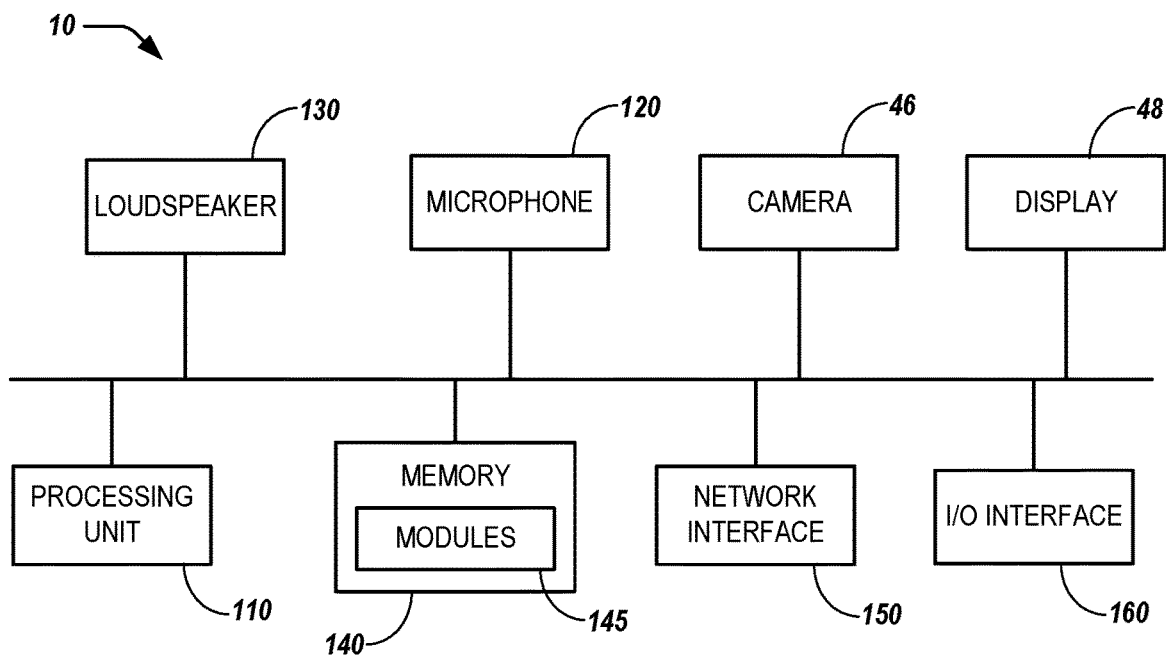
FIG. 2 illustrates components of the operational environment of FIG. 1.

FIG. 2 illustrates components of the conferencing endpoint of FIG. 1 in detail. The endpoint 10 has a processing unit 110, memory 140, a network interface 150, and a general input/output (I/O) interface 160 coupled via a bus 100. As above, the endpoint 10 has the base microphone 120, loudspeaker 130, the camera 46, and the display 48.

The processing unit 110 includes a CPU, a GPU, or both. The memory 140 can be any conventional memory such as SDRAM and can store modules 145 in the form of software and firmware for controlling the endpoint 10. The stored modules 145 include the various video and audio codecs 32/42 and software components of the other modules 20/30/40/50/200 discussed previously. Moreover, the modules 145 can include operating systems, a graphical user interface (GUI) that enables users to control the endpoint 10, and other algorithms for processing audio/video signals.

The network interface 150 provides communications between the endpoint 10 and remote endpoints (60). By contrast, the general I/O interface 160 can provide data transmission with local devices such as a keyboard, mouse, printer, overhead projector, display, external loudspeakers, additional cameras, microphones, etc.

As described above, the endpoint 10 captures frames of video, selectively crops the frames to view regions, and selectively applies deformation or distortion correction to the view regions based on size of the view regions. Because distortion may be more noticeable in relatively larger view regions and deformation may be more noticeable in relatively smaller view regions, selectively using one of the correction techniques enhances quality of video during a communication session by addressing irregularities that may be more noticeable to a communication session participant. Thus, FIG. 2 illustrates an example physical configuration of a device that selectively corrects deformation or distortion to enhance quality of a video.

Figure 3A:
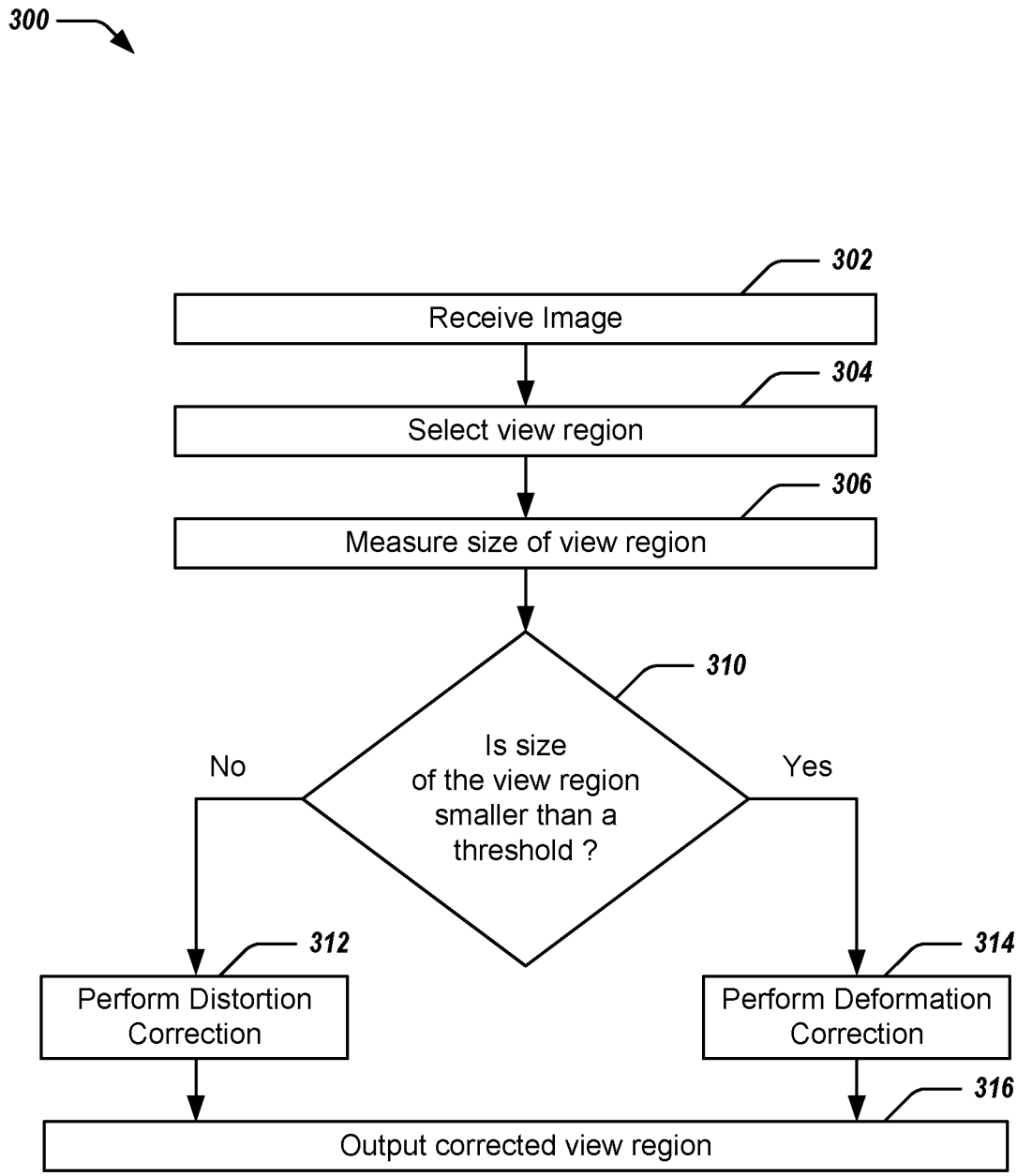
FIG. 3A illustrates a method of selectively correcting deformation or distortion in an image, in accordance with an embodiment of this disclosure.

Referring to FIG. 3A, a flowchart illustrating a method 300 of selectively applying corrections to an image is shown. The method 300 includes receiving an image, at 302. For example, the endpoint 10 may receive a frame of video via the camera 46. The method 300 further includes selecting a view region, at 304. For example, the control module 20 may select a view region in the frame based on a context of a communication session, such as which participant is currently speaking. The video module 40 may then crop the frame to the view region if the view region is smaller than the frame.

The method 300 further includes measuring a size of the view region, at 306. For example, the video module 40 may determine a size of the view region in absolute terms (e.g., length and width in some unit, such as pixels) or in comparison to a size of the frame. The method 300 further includes determining whether a size of the view region is smaller than a threshold, at 310. An illustrative example of a threshold is ½ of a view of the entire frame.

If the size of the view region is not smaller than the threshold, the method 300 includes performing distortion correction to generate a corrected view region, at 312. For example, the video module 40 may apply the distortion correction logic 74 to the view region in response to determining that the view region is larger than the threshold.

If the size of the view region is smaller than the threshold, the method 300 includes performing deformation correction to generate the corrected view region, at 314. For example, the video module 40 may apply the deformation correction logic 72 to the view region in response to determining that the view region is smaller than the threshold.

Figure 3B:
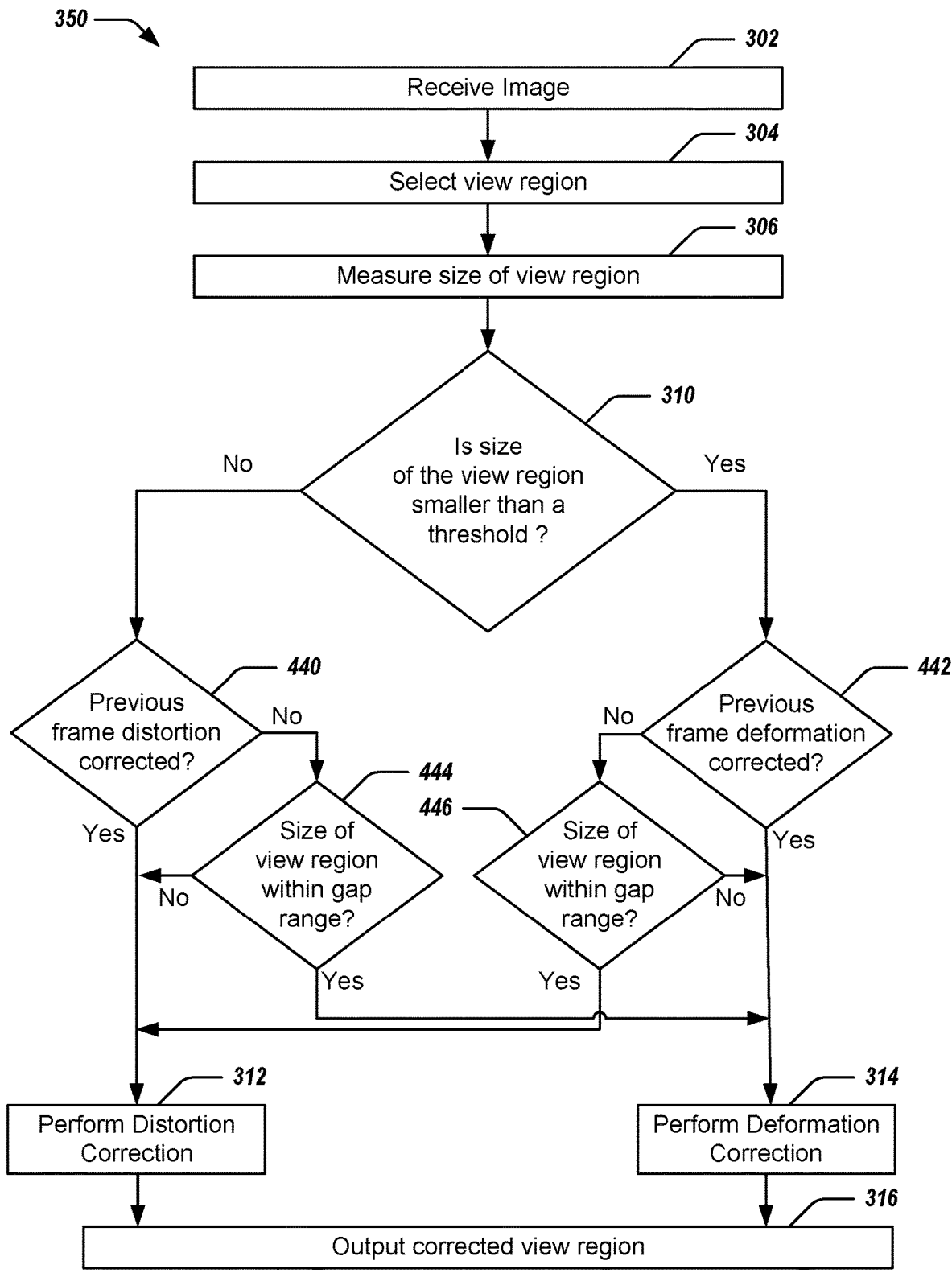
FIG. 3B illustrates an alternate implementation of the method for selectively correcting deformation or distortion in an image.

The method 300 further includes outputting the corrected view region, at 316. For example, the endpoint 10 may output the corrected view region as a corrected near-end video frame to the remote endpoints 60 or to the display device 48. In some implementations, the method 300 includes fewer or additional steps. For example, FIG. 3B illustrates, a method 350 that is an alternative version of the method 300 that includes image stabilization steps. For example, prior to performing distortion correction, at 312, the method 350 includes determining whether the previous frame was distortion corrected, at 440. If the previous frame was distortion corrected, the method includes performing distortion correction, at 312, as described above. If the previous frame was deformation corrected, the method 350 includes determining whether the size of the view region is within a gap range, at 444. The gap range is determined based on a size of the size threshold used at 310. In some implementations, the gap range corresponds to the size threshold plus or minus one half the size threshold. If the size of the view region is within the gap range, the method 350 includes performing deformation correction, at 314, rather than performing distortion correction, at 312. If the size of the view region is outside of the gap range, the method 350 includes performing distortion correction, at 312. Similarly, prior to performing deformation correction, at 314, the method 350 includes determining whether the previous frame was deformation corrected, at 442. If the previous frame was deformation corrected, the method 350 includes performing deformation correction, at 314, as described above. If the previous frame was distortion corrected, the method 350 includes determining whether the size of the view region is within the gap range, at 446. If the size of the view region is within the gap range, the method 350 includes performing distortion correction, at 312, rather than performing deformation correction, at 314. If the size of the view region is outside of the gap range, the method 350 includes performing deformation correction, at 314. Thus, the method 350 includes additional steps to increase stability of video output generated by the method 300 by avoiding rapid switching between deformation and distortion correction between frames. It should be noted that in some implementations, the image stabilization steps may include a timeout feature. In such implementations, the method 350 includes performing the correction dictated by a comparison of the size of the view region to the threshold regardless of whether the size of the view region is within the gap range based on a timer or counter.

Figure 4:
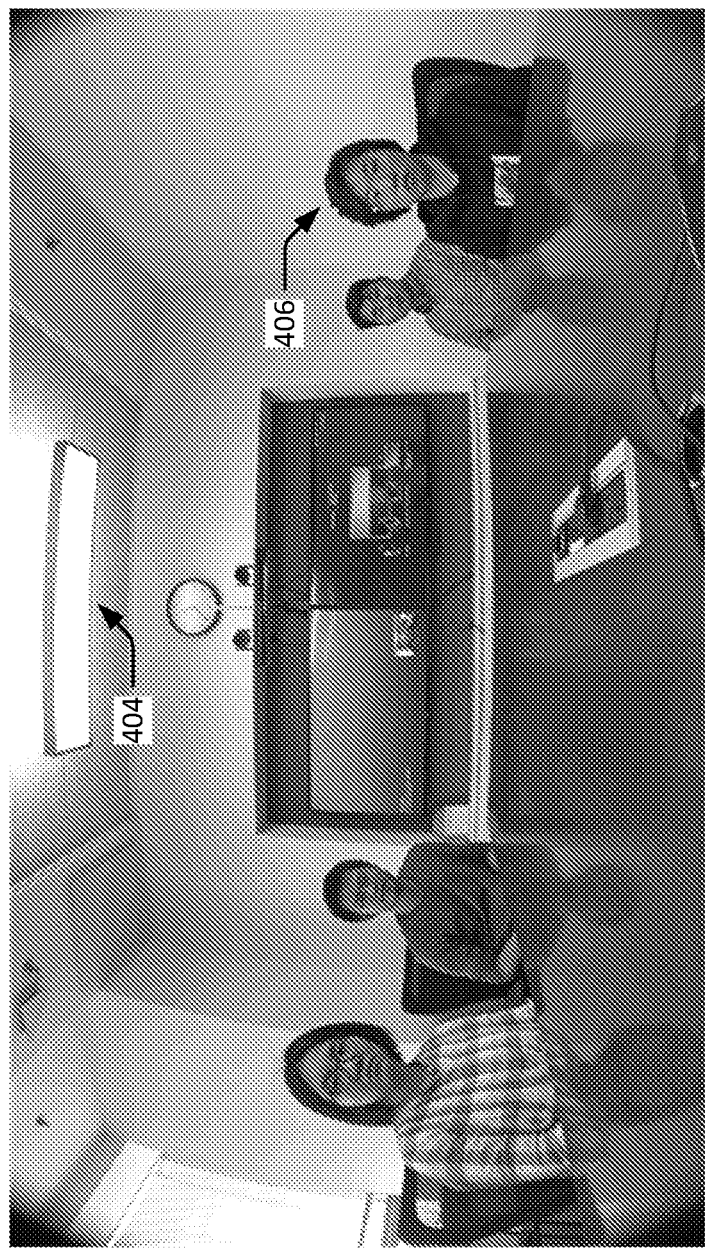
FIG. 4 illustrates a full frame image corrected by a deformation correction logic.
Figure 5:
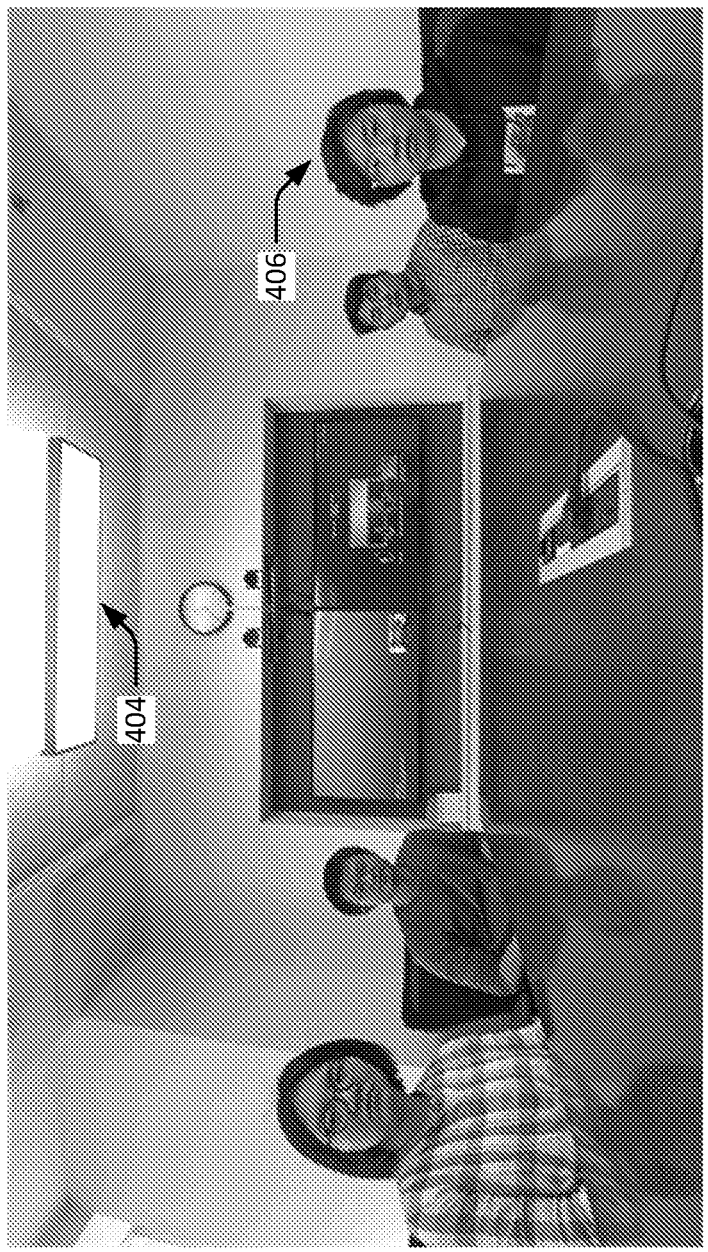
FIG. 5 illustrates a full frame image corrected by a distortion correction logic.
Figure 6:
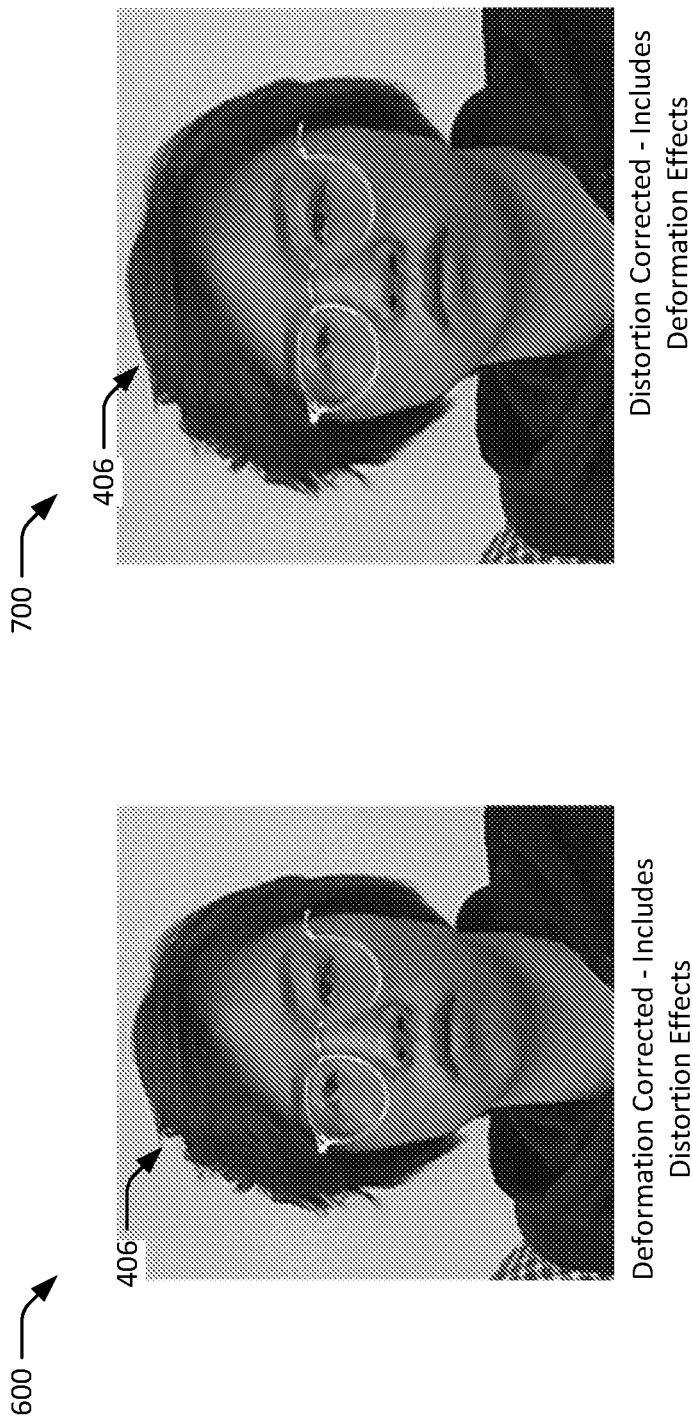
FIG. 6 illustrates distortion and deformation corrected view regions.

FIGS. 4-6 illustrate benefits of the method 300. In particular, FIGS. 4-6 show that distortion effects may be more noticeable in full frame images while deformation effects may be more noticeable in cropped (e.g., zoomed in) view regions. Referring to FIG. 4, a deformation corrected full frame 400 is shown. The deformation corrected full frame 400 corresponds to a first video frame captured by the camera 46 as corrected by the deformation correction logic 72. The deformation corrected full frame 400 depicts a light fixture 400 and a participant 406. As illustrated, lines of the light fixture 406 are distorted (e.g., artificially curved) due to the wide angle lens used to capture the first video frame. In comparison, FIG. 5 shows distortion corrected full frame 500. The distortion corrected full frame 500 corresponds to the first video frame captured as corrected by the distortion correction logic 74. As illustrated, distortion of the light fixture 404 (and other distortion effects) is corrected in the distortion corrected full frame 500, but there deformation effects are present. In particular, a face of the participant 406 is radially stretched in the distortion corrected full frame 500 as compared to the deformation corrected full frame 400. However, the distortion effects shown in the deformation corrected full frame image 400 may be more noticeable to viewers as compared to the deformation effects shown in the distortion corrected full frame 500.

FIG. 6 on the other hand illustrates that deformation may be more noticeable in a cropped view region. FIG. 6 shows a deformation corrected view region 600 and a distortion corrected view region 700. The deformation corrected view region 600 corresponds to a view region centered on the participant 406 as corrected by the deformation correction logic 72. The distortion corrected view region 700 corresponds to a view region centered on the participant 406 as corrected by the distortion correction logic 74. As shown, deformation effects (e.g., radial stretching) on the face of the participant 406 may be more noticeable in the distortion corrected view region 700 as compared to distortion effects shown in the deformation corrected view region 600.

Thus, FIGS. 4-6 illustrate that performing distortion correction on relatively larger view regions (e.g., larger than the threshold) and performing deformation correction on relatively smaller view regions (e.g., smaller than the threshold) may improve quality of near-end video as output to a display or remote endpoint. Accordingly, selectively performing distortion correction or deformation correction a view region based on a size of the view region, as in the method 300, may result in improved video output to a display device or remote endpoint.

Figure 7A:
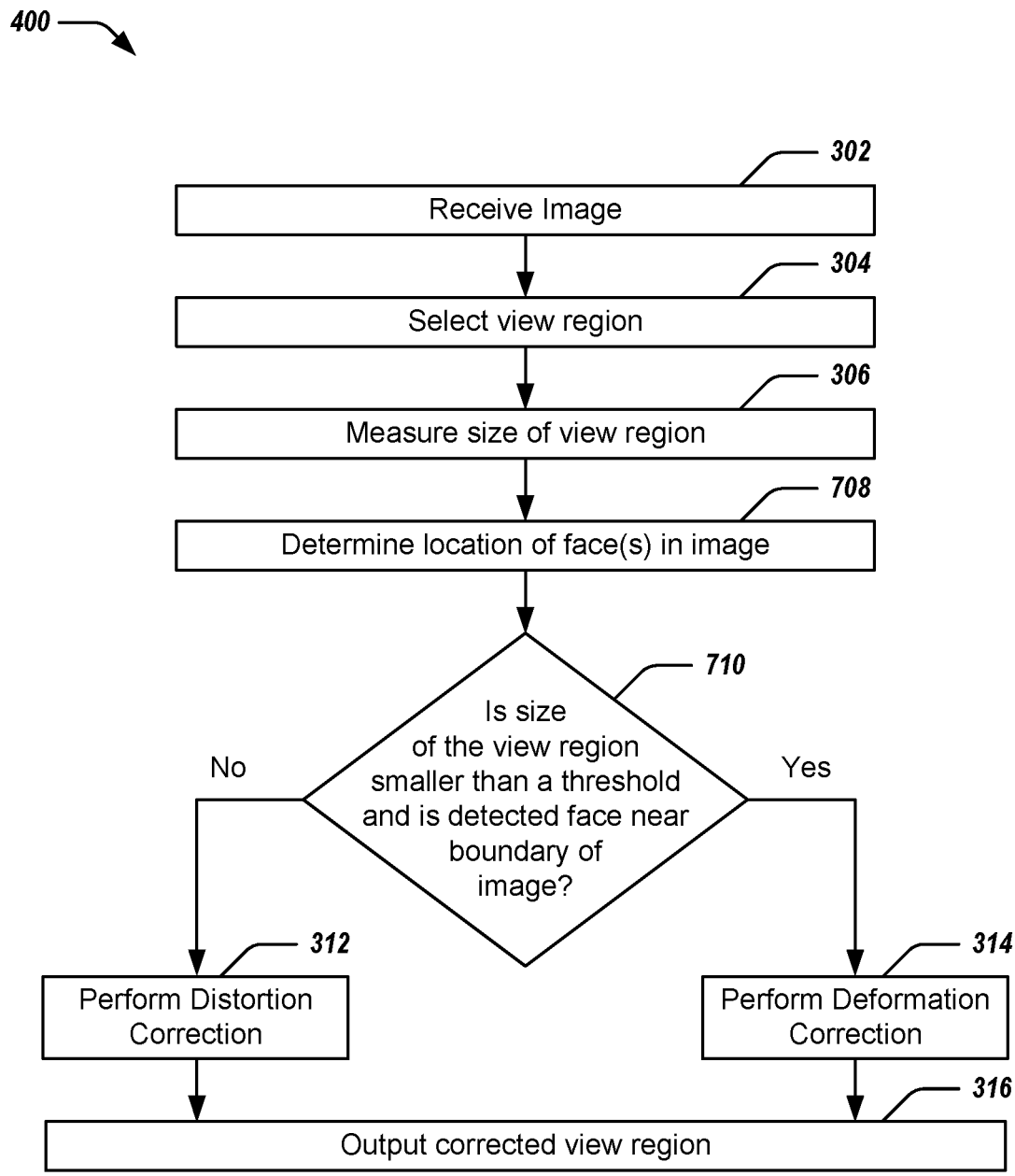
FIG. 7A illustrates another method of selectively correcting deformation or distortion in an image.

FIG. 7A shows a flowchart illustrating an alternative method 700 of selectively applying corrections to an image. The method 700 corresponds to the method 300 except the method 700 includes determining locations of faces in the image, at 708, after measuring the size of the view region, at 306. Further, the method 700 includes determining whether a size of the view region is smaller than a threshold and whether the detected faces are near a boundary of the image, at 710, rather than simply determining whether a size of the view region is smaller than the threshold, at 310. For example, the video module 40 may perform facial detection to identify a location within the image of a face depicted in the view region. The video module 40 may further determine whether the position is within a threshold distance of the boundary (or outside of a threshold distance of the center of the image). If the size of the region is larger than the threshold or the detected face is not near the boundary of the image, the method 700 includes performing distortion correction, at 312. If the size of the region is smaller than the threshold and the detected face is near the boundary of the image, the method 700 includes performing deformation correction, at 314.

Figure 7B:
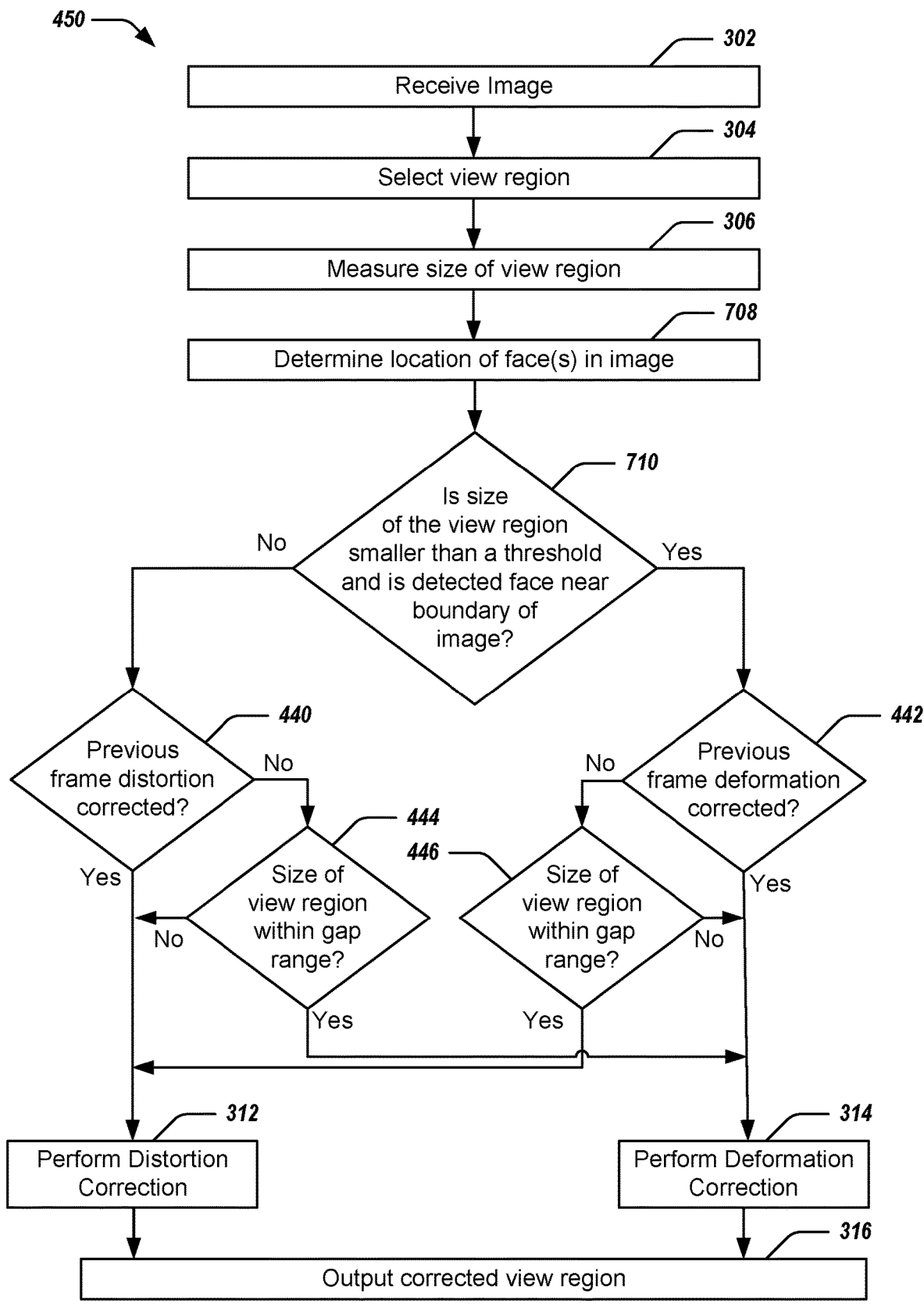
FIG. 7B illustrates an alternate implementation of the other method for selectively correcting deformation or distortion in an image.

Alternative implementations of the method 700 may include the image stabilization techniques described above with reference to FIG. 3B. For example, FIG. 7B illustrates a method 750 that corresponds to an alternate version of the method 700 including the image stabilization techniques described above. It should be noted that some method steps illustrated in FIGS. 3A-B and 7A-B may be performed in different sequences than illustrated.

Figure 8:
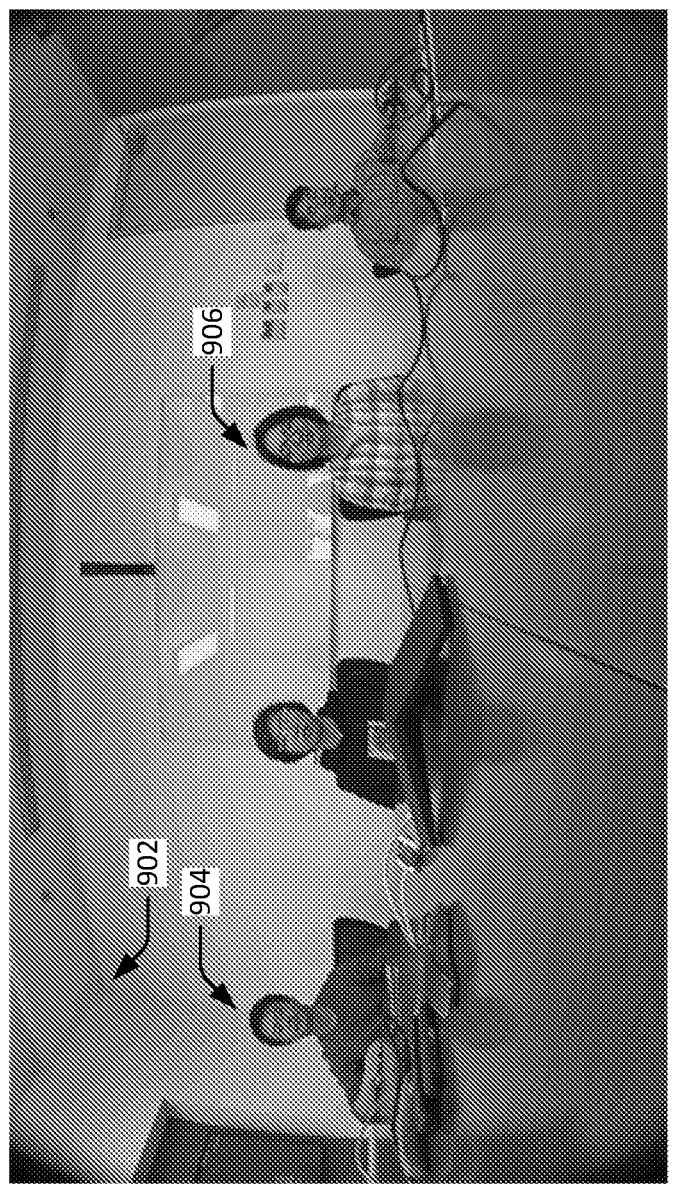
FIG. 8 illustrates a full frame image corrected by deformation correction logic.
Figure 9:
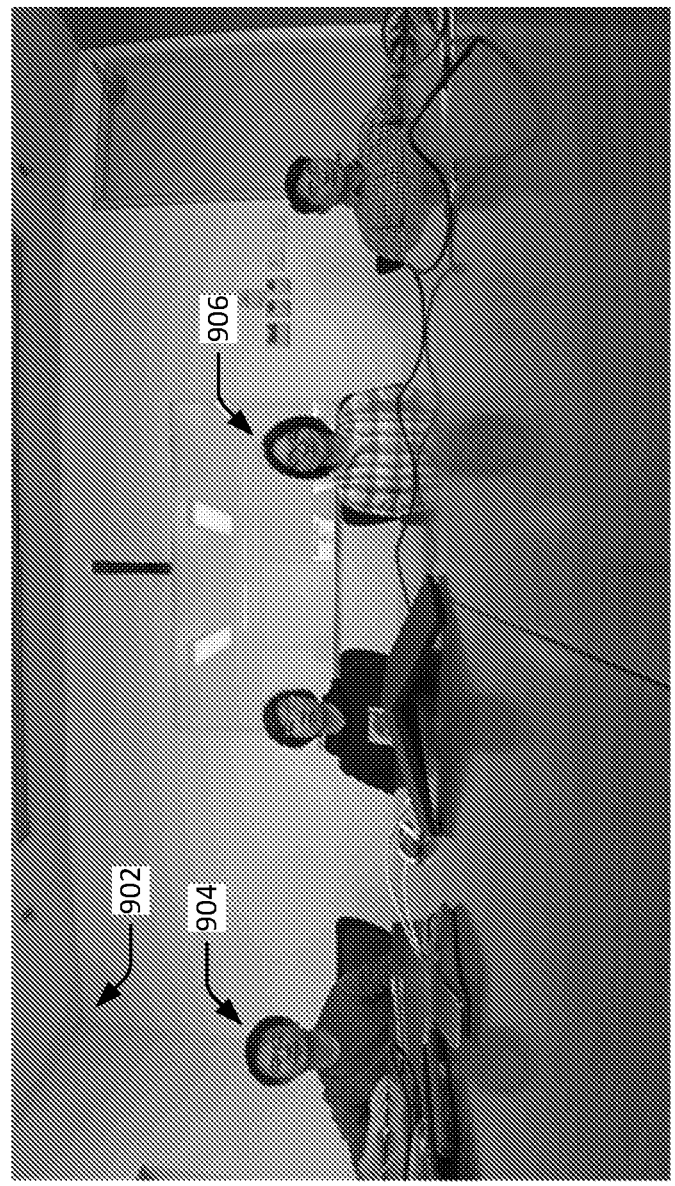
FIG. 9 illustrates a full frame image corrected by distortion correction logic.

FIGS. 8-11 illustrate benefits of the method 700. FIG. 8 shows a deformation corrected full frame 800 generated by applying the deformation correction logic 72 to a second full video frame captured by the camera 46. The deformation corrected full frame 800 depicts walls 902, a first participant 904, and a second participant 906. In the deformation corrected full frame 800 straight lines are distorted due to the properties of the wide angle lens of the camera 46. For example, lines of the walls 902 are bent rather than straight. FIG. 9 shows a distortion corrected full frame 900 generated by applying the distortion correction logic 74 to the second full video frame. As shown, the lines of the walls 902 may appear more natural as compared to the deformation corrected full frame 800 while deformation effects in the distortion corrected full frame 900 may be difficult to notice. Accordingly, distortion correction may be more desirable in relatively larger view regions.

Figure 10:
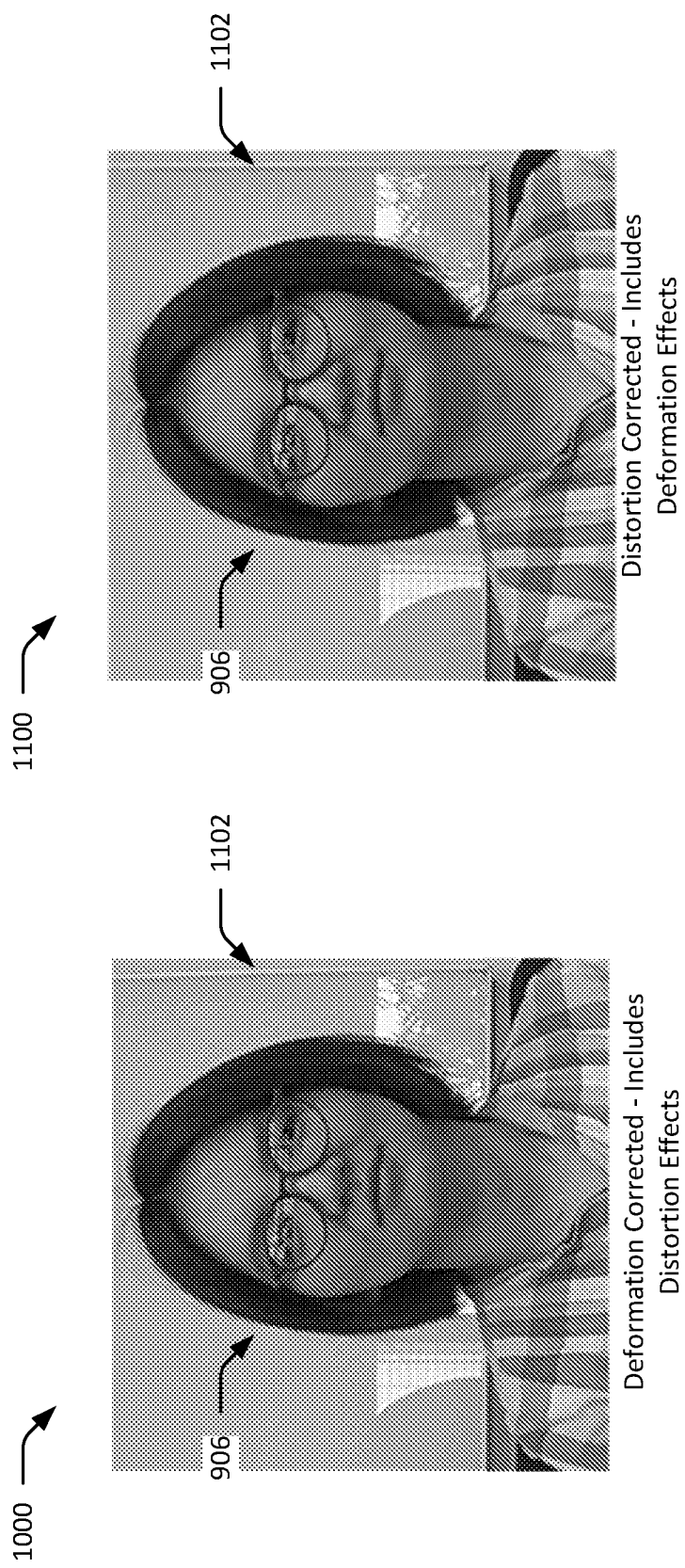
FIG. 10 illustrates both deformation corrected and a distortion corrected versions of a view region relatively near a center of an image.

FIG. 10 illustrates that deformation effects are not strong near a center of a frame captured by a wide angle lens. In particular, FIG. 10 depicts a deformation corrected view region 1000 centered on the second participant 906 and a distortion corrected view region 1100 centered on the second participant 906. While lines of a background 1102 are distorted in the deformation corrected view region 1000 centered on the second participant 906, deformation effects to the second participant 906 may be difficult to detect in the distortion corrected image 1100 because the face of the second participant is relatively near (e.g., with a threshold distance of) a center of second frame. Thus, distortion correction may be more desirable for view regions that focus on faces near a center of a frame.

Figure 11:
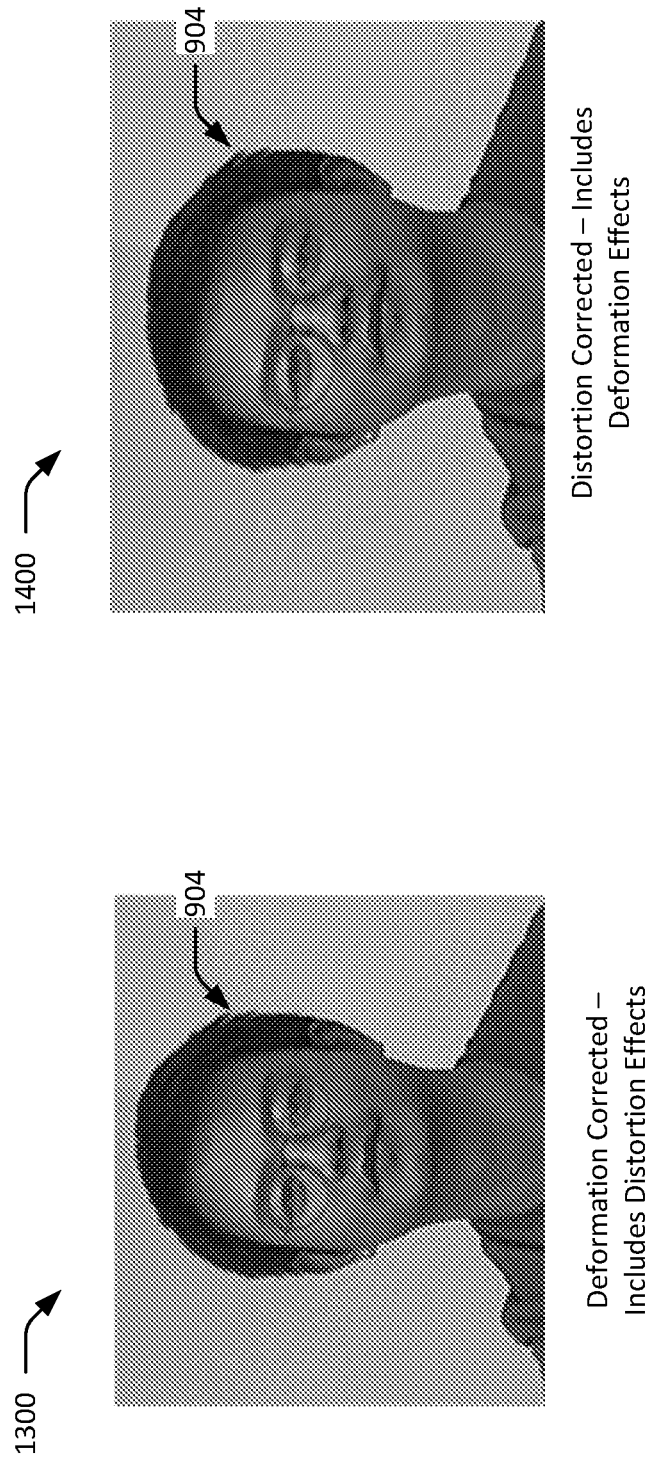
FIG. 11 illustrates both deformation corrected and a distortion corrected versions of a view region relatively near a border of an image.

FIG. 11 illustrates that deformation effects are stronger away from a center of a frame captured by a wide angle lens. In particular, FIG. 11 depicts a deformation corrected view region 1300 centered on the first participant 904 and a distortion corrected view region 1400 centered on the first participant 904. As illustrated, deformation of the face of the first participant may be more extreme in the distortion corrected view region 1400 as compared to deformation of the face of the second participant 906 in the distortion corrected view region 1100 because the first participant 904 is farther from the center of the second frame. Thus, deformation correction may be more desirable for relatively smaller (e.g., smaller than a threshold) view regions that focus on faces near a center of a frame (e.g., within a threshold distance of a boundary of the frame).

Therefore, FIGS. 8-11 illustrate that performing distortion correction on relatively larger view regions (e.g., larger than the threshold) or smaller view regions near a center of an image and performing deformation correction on relatively smaller view regions (e.g., smaller than the threshold) near borders of the image may improve quality of near-end video as output to a display or remote endpoint. Accordingly, selectively performing distortion correction or deformation correction a view region based on a size of the view region and a position in an image of a face within the view region, as in the method 700, may result in improved video output to a display device or remote endpoint.

Figure 12:
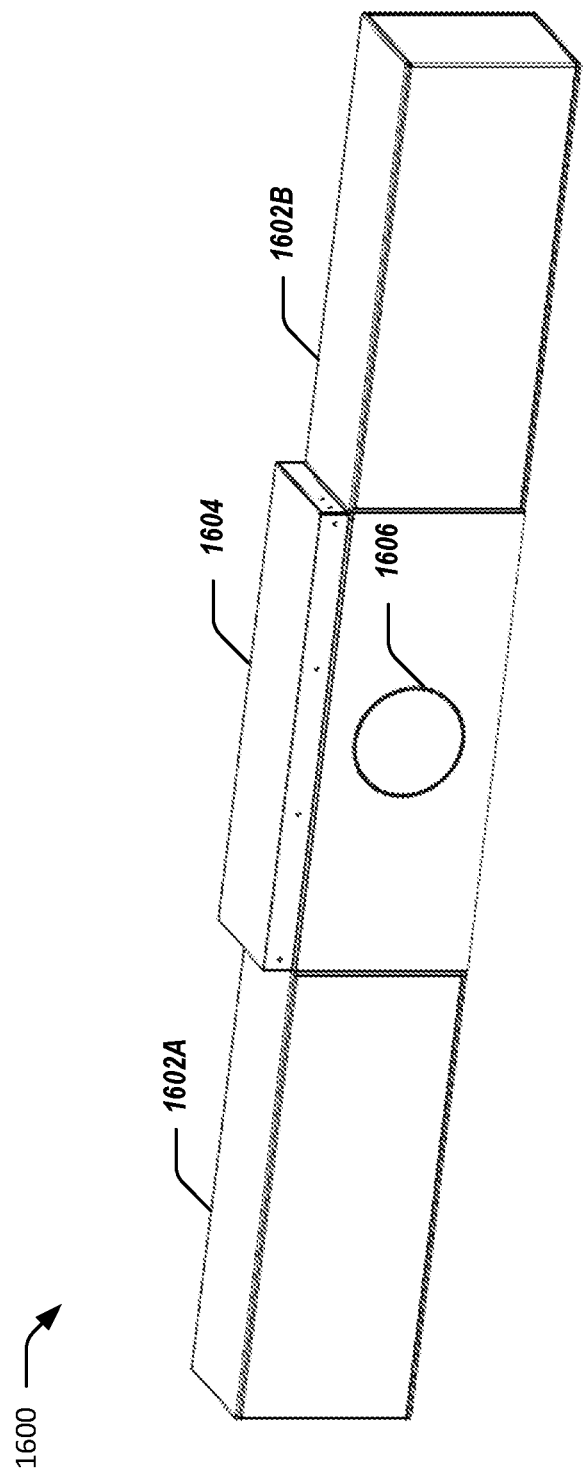
FIG. 12 illustrates an electronic device which can be employed to practice the concepts and methods of this disclosure.

Referring to FIG. 12, a diagram illustrating an example of a device 1600 that is configured to perform selective distortion or deformation correction on video frames is shown. The device 1600 includes speakers 1602A, 1062B, a microphone array 1604, and a camera 1606. While not illustrated, the device 1600 further includes an output interface configured to output video to a display and/or a communication interface configured to exchange data with a remote endpoint. The device 1600 is configured to capture video using the camera 1606 and to generate distortion or deformation corrected versions of video output as described herein. In some implementations the device 1600 corresponds to the endpoint 10. Thus, FIG. 16 illustrates an example of a device that may selectively correct distortion or deformation in images captured by a camera with a wide angle lens.

The various embodiments described above are provided by way of illustration only, and should not be construed so as to limit the scope of the disclosure. Various modifications and changes can be made to the principles and embodiments described herein without departing from the scope of the disclosure and without departing from the claims which follow.

The invention claimed is:

1. A method comprises:
receiving, at a conference endpoint, video captured using a wide angle lens;
selecting a view region in a frame of the video;
selectively applying, based on a size of the view region, deformation correction or distortion correction to the view region to generate a corrected video frame; and
transmitting the corrected video frame to a remote endpoint,
wherein selectively applying, based on the size of the view region, deformation correction or distortion correction includes applying the deformation correction to the view region in response to determining that the size of the view region is less than a threshold size.

2. The method of claim 1, wherein the threshold size corresponds to half a size of the frame of the video.

3. The method of claim 1, wherein selecting the view region in the frame of the video includes detecting, at the conference endpoint, an active participant in a conference and cropping the frame to an area around the active participant.

4. The method of claim 1, wherein the deformation correction corresponds to a first table mapping indicating one or more first transformations to apply to the view region to correct deformation effects in the view region and the distortion correction corresponds to a second table mapping indicating one or more second transformations to apply to the view region to correct distortion effects in the view region.

5. The method of claim 1, wherein selectively applying, based on the size of the view region, the deformation correction or the distortion correction further includes:
identifying a location, in the frame, of a face depicted in the view region and;
applying the deformation correction in response to determining that the location of the face is within a threshold range of a border of the frame and that the size of the view region is smaller than a threshold size.

6. The method of claim 1, wherein selectively applying, based on the size of the view region, the deformation correction or the distortion correction is based further on whether the deformation correction or the distortion correction was applied to a previous frame.

7. A computer readable storage device storing instructions executable by one or more processors to:
receive video captured using a wide angle lens;
select a view region in a frame of the video;
selectively apply, based on a size of the view region, deformation correction or distortion correction to the view region to generate a corrected video frame; and
transmit the corrected video frame to a remote endpoint,
wherein selectively applying, based on the size of the view region, the deformation correction or the distortion correction further includes:
identifying a location, in the frame, of a face depicted in the view region and;
applying the deformation correction in response to determining that the location of the face is within a threshold range of a border of the frame and that the size of the view region is smaller than a threshold size.

8. The computer readable storage device of claim 7, wherein selectively applying, based on the size of the view region, deformation correction or distortion correction includes applying the deformation correction to the view region in response to determining that the size of the view region is less than a threshold size.

9. The computer readable storage device of claim 8, wherein the threshold size corresponds to half a size of the frame of the video.

10. The computer readable storage device of claim 7, wherein selecting the view region in the frame of the video includes detecting an active participant in a conference and cropping the frame to an area around the active participant.

11. The computer readable storage device of claim 7, wherein the deformation correction corresponds to a first table mapping indicating one or more first transformations to apply to the view region to correct deformation effects in the view region and the distortion correction corresponds to a second table mapping indicating one or more second transformations to apply to the view region to correct distortion effects in the view region.

12. The computer readable storage device of claim 7, wherein selectively applying, based on the size of the view region, the deformation correction or the distortion correction is based further on whether the deformation correction or the distortion correction was applied to a previous frame.

13. An apparatus comprising:
a camera including a wide angle lens;
one or more processors; and
a memory storing instructions executable by the one or more processors to:
receive video captured by the camera;
select a view region in a frame of the video;
selectively apply, based on a size of the view region, deformation correction or distortion correction to the view region to generate a corrected video frame; and
transmit the corrected video frame to a remote endpoint,
wherein selecting the view region in the frame of the video includes detecting active participant in a conference and cropping the frame to an area around the active participant.

14. The apparatus of claim 13, wherein selectively applying, based on the size of the view region, deformation correction or distortion correction includes applying the deformation correction to the view region in response to determining that the size of the view region is less than a threshold size.

15. The apparatus of claim 14, wherein the threshold size corresponds to half a size of the frame of the video.

16. The apparatus of claim 13, wherein the deformation correction corresponds to a first table mapping indicating one or more first transformations to apply to the view region to correct deformation effects in the view region and the distortion correction corresponds to a second table mapping indicating one or more second transformations to apply to the view region to correct distortion effects in the view region.

17. The apparatus of claim 13, wherein selectively applying, based on the size of the view region, the deformation correction or the distortion correction further includes:
identifying a location, in the frame, of a face depicted in the view region and;
applying the deformation correction in response to determining that the location of the face is within a threshold range of a border of the frame and that the size of the view region is smaller than a threshold size.

* * * * *